(12) United States Patent
Popescu et al.

(10) Patent No.: US 8,203,944 B2
(45) Date of Patent: Jun. 19, 2012

(54) TRANSMISSION RATE SELECTION

(75) Inventors: Andrei Barbu Popescu, Cambridge (GB); Timothy Condren Smith, Cambridge (GB); Peter William Stephenson, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 0 days.

(21) Appl. No.: 11/937,977

(22) Filed: Nov. 9, 2007

(65) Prior Publication Data

US 2008/0117814 A1    May 22, 2008

(30) Foreign Application Priority Data

Nov. 15, 2006  (GB) .................................. 0622830.8

(51) Int. Cl.
*G01R 31/08* (2006.01)
(52) U.S. Cl. ......................................................... 370/230
(58) Field of Classification Search .................. 370/230, 370/252
See application file for complete search history.

(56) References Cited

U.S. PATENT DOCUMENTS

| | | | |
|---|---|---|---|
| 5,469,471 A | 11/1995 | Wheatley, III | |
| 5,638,408 A * | 6/1997 | Takaki | 375/341 |
| 5,896,374 A * | 4/1999 | Okumura et al. | 370/311 |
| 6,480,477 B1 * | 11/2002 | Treadaway et al. | 370/314 |
| 6,535,523 B1 * | 3/2003 | Karmi et al. | 370/468 |
| 6,760,313 B1 * | 7/2004 | Sindhushayana et al. | 370/252 |
| 6,898,198 B1 * | 5/2005 | Ryan et al. | 370/338 |
| 6,904,021 B2 * | 6/2005 | Belcea | 370/252 |
| 6,912,198 B2 * | 6/2005 | Dacosta | 370/229 |
| 7,143,320 B2 * | 11/2006 | Cavin | 714/704 |
| 7,257,094 B2 * | 8/2007 | Shoemake | 370/311 |
| 7,260,054 B2 * | 8/2007 | Olszewski | 370/208 |
| 7,301,965 B2 * | 11/2007 | Cimini et al. | 370/470 |
| 7,355,996 B2 * | 4/2008 | Hrastar | 370/328 |
| 7,369,510 B1 * | 5/2008 | Wong et al. | 370/252 |
| 7,388,903 B2 * | 6/2008 | Godfrey | 375/219 |
| 7,394,791 B2 * | 7/2008 | Proctor, Jr. | 370/335 |
| 7,397,805 B2 * | 7/2008 | Gao et al. | 370/395.41 |
| 7,400,674 B2 | 7/2008 | Gu | |
| 7,403,488 B2 * | 7/2008 | Gu et al. | 370/252 |
| 7,411,935 B2 * | 8/2008 | Ryan et al. | 370/338 |
| 7,489,650 B2 * | 2/2009 | Ginzburg et al. | 370/314 |
| 7,499,486 B2 * | 3/2009 | Boer et al. | 375/219 |
| 7,519,030 B2 * | 4/2009 | Cimini et al. | 370/338 |
| 7,646,744 B2 | 1/2010 | Li | |
| 7,684,502 B2 | 3/2010 | Kurobe et al. | |
| 2004/0190451 A1 * | 9/2004 | Dacosta | 370/230 |
| 2005/0105604 A1 * | 5/2005 | Ito et al. | 375/225 |
| 2006/0153150 A1 * | 7/2006 | Yang et al. | 370/338 |
| 2006/0221847 A1 * | 10/2006 | Dacosta | 370/252 |
| 2008/0117814 A1 | 5/2008 | Popescu et al. | |

\* cited by examiner

*Primary Examiner* — Kwang B Yao
*Assistant Examiner* — Jung-Jen Liu
(74) *Attorney, Agent, or Firm* — Greenberg Traurig, LLP

(57) ABSTRACT

A method for transmitting data over a network in which multiple transmission conditions can be used for transmitting data, the method comprising selecting a transmission condition to be used when transmitting data over the network, said selection being made in dependence on a predetermined preference distribution that for each of the multiple transmission conditions defines a probability of that transmission condition being selected, using the selected transmission condition when transmitting data over the network and determining the success of the transmission and updating the preference distribution in dependence on the success of the transmission and thereafter selecting a transmission condition for transmitting data over the network in dependence on the updated preference distribution.

17 Claims, 3 Drawing Sheets

TRANSMISSION RATE SELECTION

CROSS-REFERENCE TO RELATED APPLICATION

This patent application claims priority to Great Britain Patent Application No. 0622830.8, entitled "TRANSMISSION RATE SELECTION", filed Nov. 15, 2006, which is incorporated herein by reference.

BACKGROUND

In some communications networks, different transmission conditions may be available for transmitting data across the network. Such transmission conditions could include transmission rate, modulation method, and transmit frequency band, to name a few. An example of one such type of network is the class of networks that operate according to the IEEE 802.11 standards. These networks are wireless local area networks (WLAN) and are commonly known as wi-fi networks.

There are currently six different 802.11 standards defining operation of wi-fi networks. A network operating according to the 802.11g standard may operate according to 12 different data rates (ranging from 1 Mbit/s to 54 Mbit/s) and using three different modulation techniques (including orthogonal frequency division multiplexing (OFDM), complementary code keying (CCK) and differential binary or quadrature phase shift keying (DBPSK/DQPSK) together with direct-sequence spread-spectrum (DSSS)). Typically, a specific modulation technique is used when transmitting at one of a group of data rates. So, for example, OFDM may be used for data rates of 6, 9, 12, 18, 24, 36, 48 and 54 Mbit/s, CCK for data rates of 5.5 and 11 Mbit/s and DBPSK/DQPSK+DSSS for data rates of 1 and 2 Mbit/s.

Wi-fi networks tend to be subjected to different models of interference from wired networks. For example, devices operating in a wi-fi network that uses a certain transmit band may be subject to interference from other devices using that band. An example is a wi-fi network that uses the 2.4 GHz range. Such a network will tend to be subject to interference from other devices operating in this range, which include Bluetooth devices, cordless telephones and microwave ovens. In addition, wireless networks tend to be subject to interference from physical objects located in the transmission path.

Interference results in transmitted signals being received with varying degrees of success by a receiving device, ranging from receiving the data with a few errors to not receiving the data at all. In a typical wi-fi network, data that is successfully received by a receiving device may be acknowledged so that the transmitting device knows that the data has been successfully received. Data may be deemed to have been successfully received if it is received with no errors or if it is received with few enough errors that the receiving device is able to correct those errors using an error correction technique. A transmitting device may retransmit a data packet if it does not receive an acknowledgement confirming that the data packet was successfully received within a predetermined time of transmitting that packet. This retransmission process may be repeated a predetermined number of times before the transmission is deemed a failure.

According to current rate adaptation algorithms for wi-fi networks, poor transmission quality at a given data rate typically causes the data rate to be reduced (provided that there is a lower data rate available). However, a lower data rate is not always beneficial. For example, transmitting a data packet at a lower data rate takes longer and thus the transmission is more likely to be affected by interference. Also, lowering the data rate can cause a different modulation technique to be used, which may be less reliable. For example, CCK tends to be less reliable than OFDM.

One rate selection method that does not automatically drop the data rate if the transmission quality at the given data rate is poor is known as SampleRate. SampleRate chooses the bit rate it predicts will provide the most throughput based on estimates of the expected per-packet transmission time at each data rate. According to this algorithm, data packets may be periodically sent at data rates other than the current data rate so as to estimate when another data rate may provide a better performance. However, this method has the disadvantage that the throughput estimated for one of the available data rates may be adversely affected by interference of short duration, which then renders a potentially advantageous data rate unlikely to be used until its throughput is re-estimated. This method also requires estimated throughputs to be stored for each of available data rates.

SUMMARY OF THE DISCLOSURE

According to a first embodiment of the disclosure, there is provided a method for transmitting data over a network in which multiple transmission conditions can be used for transmitting data, the method comprising selecting a transmission condition to be used when transmitting data over the network, said selection being made in dependence on a predetermined preference distribution that for each of the multiple transmission conditions defines a probability of that transmission condition being selected, using the selected transmission condition when transmitting data over the network and determining the success of the transmission and updating the preference distribution in dependence on the success of the transmission and thereafter selecting a transmission condition for transmitting data over the network in dependence on the updated preference distribution.

The transmission condition may include a transmission rate and/or a method of modulating data.

The selecting may be done in such a way that the probability of a transmission condition being selected is in accordance with the probability defined for that transmission condition by the preference distribution. The selecting may be done by randomly selecting a transmission condition in such a way that the probability of a transmission condition being selected is in accordance with the probability defined for that transmission condition by the preference distribution.

A transmission may be deemed to be successful if an acknowledgement is received for the transmitted data, a transmission being repeated until such an acknowledgement is received or until the number of transmissions exceeds a predetermined number without an acknowledgement having been received for the transmitted data. The step of determining the success of the transmission may be performed in dependence on the number of times the data is transmitted without receiving an acknowledgement for that data.

The method may comprise selecting a transmission condition if the data is transmitted a predetermined number of times using the selected transmission condition without receiving an acknowledgement for that data or if a predetermined amount of data is successfully transmitted using the selected transmission condition.

The method may comprise determining a transmission score for the selected transmission condition in dependence on the success of the transmission using the selected transmission condition. The method may comprise determining a transmission score for a transmission condition in dependence on the success of a previous transmission using that transmission condition.

Determining a transmission score for a transmission condition may comprise determining the transmission score in dependence on the number of times data has previously been transmitted using that transmission condition without receiving an acknowledgement for that data and/or in dependence on a nominal data rate associated with that transmission condition.

The method may comprise determining a maximum throughput associated with the selected transmission condition and/or a maximum throughput associated with each of the multiple transmission conditions. A maximum throughput for a transmission condition may be determined based on the average length of time taken to successfully transmit a predetermined number of data bits using that transmission condition.

The method may comprise updating the rating associated with the selected transmission condition by subtracting the transmission score associated with the selected transmission condition from the maximum throughput associated with the selected transmission condition and setting the rating associated with the selected transmission condition to be the result of that subtraction.

The method may comprise adjusting the ratings associated with each of the transmission conditions other than the selected transmission condition by, for each transmission condition: decrementing the transmission score associated with that transmission condition by a predetermined amount, subtracting the decremented transmission score from the maximum throughput associated with that transmission condition and setting the rating associated with that transmission condition to be the result of the subtraction.

A transmission condition may be selected by selecting the transmission condition associated with the highest rating.

Each transmission condition may include a transmission rate and the method may comprise interleaving transmissions at the transmission rate of the selected transmission condition with transmissions at transmission rates of others of the transmission conditions.

The network may be a wireless network, e.g., a network operable according to an 802.11 protocol.

According to a second embodiment of the disclosure, there is provided a device for selecting a transmission condition for transmitting data over a network in which multiple transmission conditions can be used for transmitting data, each transmission condition being associated with a rating indicative of how successful previous data transmissions using that transmission condition have been, the method comprising using a selected transmission condition when transmitting data over the network and updating the rating associated with the selected transmission condition in dependence on the success of the transmission, updating the rating associated with each transmission condition other than the selected transmission condition by adjusting each of those ratings by a predetermined amount and selecting a transmission condition dependent on the updated ratings.

BRIEF DESCRIPTION OF THE DRAWINGS

For a better understanding of the present disclosure, reference is made by way of example to the following drawings, in which.

DETAILED DESCRIPTION

Embodiments of the disclosure provide improved methods for selecting transmission conditions for transmitting data over a network from multiple available transmission conditions. According to one embodiment, this is achieved by selecting a transmission condition in dependence on a predetermined preference distribution. The selected transmission condition is used to transmit data over the network and the preference distribution is updated in dependence on the success of this transmission. According to a further embodiment of the disclosure, each transmission condition is associated with a rating indicative of how successful previous data transmissions using that transmission condition have been. The rating associated with a selected transmission condition is updated in dependence on the success of a transmission using that transmission condition. The ratings associated with the other transmission conditions are adjusted by a predetermined amount and a transmission condition is then selected in dependence on the updated ratings.

The methods according to different embodiments of the disclosure are described in more detail below. These embodiments are principally described with reference to transmit rates. However, this is for the purposes of example only and it should be understood that the principles of these embodiments may be used to select between any suitable transmission conditions. Such transmission conditions include, for example, transmission rate, modulation method, and transmit frequency band, to name a few.

Figure 1:
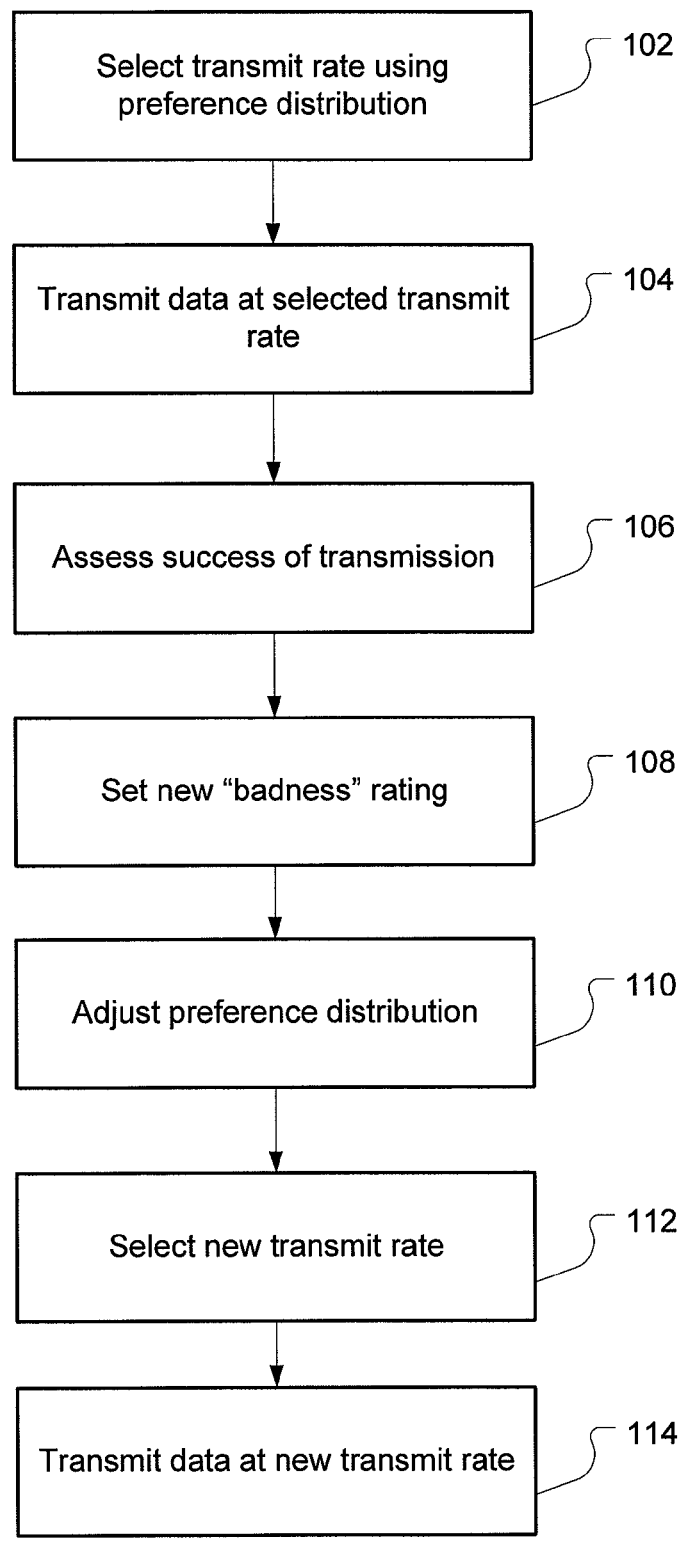
FIG. 1 shows a method of selecting a transmit rate according to one embodiment of the disclosure.

A method of selecting a transmit condition according to one embodiment of the disclosure is shown in FIG. 1. In this example, the transmission condition is a transmit rate. In step 102 the transmit rate is selected using a preference distribution. The preference distribution may be a statistical distribution that defines the likelihood or probability of a particular rate being selected. The transmit rate is selected "randomly" from the available transmit rates. However, this selection is guided by the preference distribution, which defines the probability of each transmit rate being selected. The transmit rates having a higher probability will, on average, be selected more times than those transmit rates having a lower probability.

In step 104, the selected transmit rate is used to transmit data across the network. In step 106, the success of the transmission is assessed. This assessment could include, for example, a consideration of whether or not the data was successfully transmitted, the number of retries that were required before an acknowledgement was received from the receiving party, and the time taken to receive an acknowledgement from the receiving party, to name a few. The assessment of the success of the transmission could also include a consideration of the quality of service experienced by the receiving party. For example, the transmitting device could receive an indication of how many bit errors the receiving device detected in the received data and/or the strength of signal detected by the receiving device, to name two. The step of assessing the success of the transmission therefore encompasses any consideration that is indicative of how well the transmission was accomplished.

In step 108, the success of the transmission is taken into account when setting a new "badness" rating or score associated with the transmission rate. For example, the "badness" of a transmission rate could include:

a factor proportional to the inverse of the nominal data rate if conditions were perfect. This factor is typically a predetermined constant; and/or a factor taking into account the extra time required to transmit a predetermined amount of data using the transmission rate under the current conditions (e.g., due to retransmissions).

If the determination of channel quality were made by the number of retries, the badness rating would typically be one for a successful transmission with no retries. If a number of retries were required, an appropriately larger factor estimating the relative overall time required to transmit a predetermined amount of data would typically be used to determine the badness rating. For a complete failure, some large factor based on more general considerations (the inconvenience of dropping a frame) could be used to determine the badness rating.

In step 110 the preference distribution is adjusted in dependence on the success of the transmission using the selected transmission rate. This may involve adjusting the distribution according to details of the last transmission, such as the number of retries required or whether a predetermined number of retransmissions was completed without an acknowledgement having been received from the receiving device. An acknowledgement may be deemed not to have been received if it is not received within a predetermined time from the transmission. In addition, the preference distribution may be adjusted in dependence on the difference in "badness" rating between the currently selected transmission rate and adjacent transmission rates. For example, the recently calculated badness score for the current transmission rate may be compared with badness scores stored for those transmission rates that are immediately higher and lower than the current transmission rate.

In step 112, a new transmission rate is selected using the adjusted preference distribution, and in step 114, data is transmitted using the newly selected rate. A new transmission rate may be selected each time that a transmission is completed. For example, a new transmission rate may be selected each time that a predetermined amount of data has been transmitted using the current transmission rate. This requirement may be waived in the event that a predetermined number of transmission attempts have not been successful at the current transmission rate. Alternatively, a new transmission rate may only be selected in the event that the currently selected transmission rate is falling below a minimum "success threshold". For example, a transmission rate may be considered as falling below a minimum "success threshold" if the transmissions at the current rate have required a predetermined number of retransmissions or if communications received from the receiving device indicate that the transmitted data has been received with an unacceptable quality level, e.g., the number of bit errors exceeded a predetermined threshold. A check may be performed at regular time intervals to determine whether the transmissions at the current rate are falling below the success threshold. Selecting a new transmission rate only when the current rate has been deemed unsuccessful has the advantage that a successful transmission rate is not abandoned for an unsuccessful transmission rate. However, the preference distribution should still be updated at regular intervals. Selecting a new transmission rate at regular intervals (e.g., each time a predetermined amount of data has been transmitted) has the advantage that the preference distribution tends to be more accurate as all transmission conditions will tend to be tried at some point.

Figure 2:
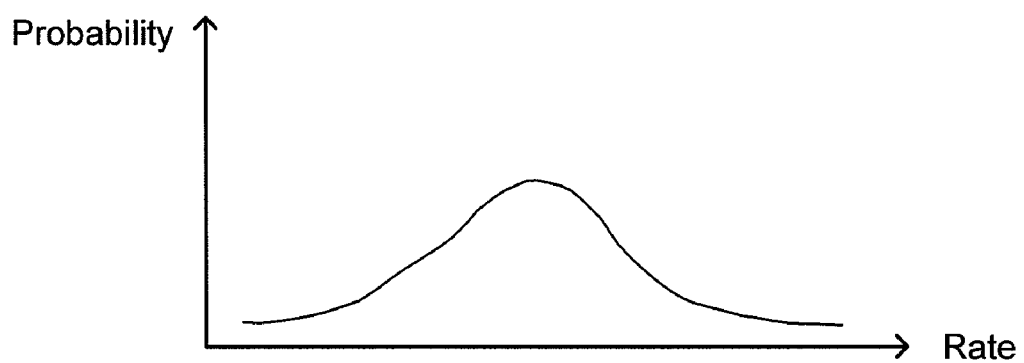
FIG. 2 shows the adjustment of a preference distribution.
Figure 2:
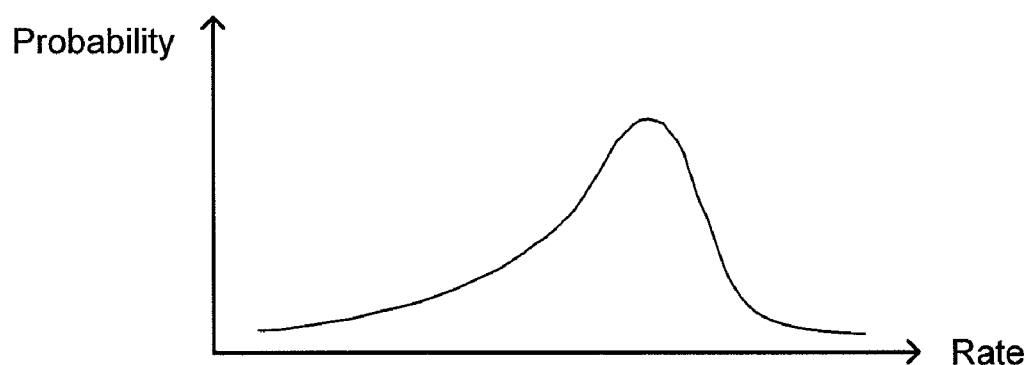

FIG. 2 illustrates an example of a preference distribution and how it may be adjusted to account for current transmission conditions. The distribution shown in the upper figure is a roughly Gaussian distribution defining the selection probability of each of the available rates. In FIG. 2, this distribution is shown as a continuous distribution for the purposes of example only. It should be understood that, in a practical implementation, the transmitting device will typically have a number of discrete transmission rates available to it and not a continuous range. Therefore, the preference distribution will tend to be a discrete distribution rather than a continuous distribution.

The distribution that is chosen as a starting point may be Gaussian, as shown in FIG. 2, or any other form. The starting distribution may evenly spread the probabilities between the transmission conditions, so that each transmission condition is equally likely to be selected, or may be preferentially slanted towards a particular condition or faster conditions. For example, higher rates and more reliable modulation techniques may be selected preferentially at the outset.

The upper diagram in FIG. 2 shows an existing preference distribution. The lower diagram in FIG. 2 shows this preference distribution after it has been adjusted to account for the degree of success experienced with the currently selected transmission rate. It can be seen that the peak of the distribution has moved to the right and that the peak has become more defined, i.e. some of transmission rates have become less likely to be selected, while others (fewer in number) of the transmission rates have become more likely to be selected. The increased definition of the peak in this case is indicative of the increased precision with which the rate most likely to be selected can be predicted. The increased precision has resulted from the accumulation of information as different transmission rates have been tried.

As explained above, the distribution may be adjusted in dependence on the number of retransmissions required at the current transmit rate, whether the transmission was successful and the difference in the badness of the current transmit rate when compared with the transmit rates adjacent to that transmit rate. The number of retransmissions at the current rate could be used to determine how much the existing preference distribution should be adjusted. For example, if the current transmit rate is located near the peak of the distribution but the transmission was deemed a failure, this would indicate that the peak is in the wrong place and should be moved and possibly "flattened" so that the distribution becomes more evenly spread. If the transmission had not been a failure, but had instead required several retries, the peak may be moved and slightly "flattened", but to a lesser extent than if the transmission had been a complete failure. Alternatively, the transmission may have required a large number of retries at a transmission rate that is located substantially distant from the peak. In this case, the result indicates that the peak may well be in the correct place, and so the peak may become more defined (e.g., higher and narrower) as a result.

Comparison with the badness scores of neighboring transmit rates can be advantageous in determining the "direction" in which the distribution should be adjusted. For example, if the transmit rate immediately lower than the current transmit rate has a higher badness score than the current transmit rate while the transmit rate immediately higher than the current transmit rate has a lower badness score than the current transmit rate, this would indicate that the distribution should be moved in the direction of increasing rate (i.e. to the right in FIG. 2).

Although FIG. 2 has been described with reference only to transmission rates, it should be understood that the same principle applies to whatever transmission conditions are being selected. For example, each entry in a discrete preference distribution could correspond to a combination of a transmit rate and a modulation technique.

The adjustment of the preference distribution may be performed under the control of software running on the transmitting device. The transmitting device may include a digital processor for performing the adjustment. The software may be supported by dedicated hardware.

The method described above may be advantageous in that it can enable a record of the transmission history using different transmission conditions to be built up through the preference distribution. Retaining some degree of randomness in the selection of the transmission conditions can enable the method to build up a relatively accurate picture of how the different transmission conditions perform without sacrificing too high a degree of throughput due to unfavorable conditions being selected too often. The method may also be advantageous in that it can minimize the amount of data that needs to be stored. The method can be successfully implemented by storing only the current preference distribution and the badness ratings for the adjacent rates to the current rate.

In order to obtain the badness ratings for the transmission rates adjacent to the current rate, transmissions at those adjacent rates may be interspersed with transmissions at the currently selected rates. Alternatively, when each rate is selected the badness rating for that transmission rate may be stored for later comparisons. There are two disadvantages with this approach: first it means that badness ratings have to be stored for all transmission rates and second, the badness ratings may not give a true reflection of the current transmission situation for transmission rates that have not been selected for some time.

Figure 3:
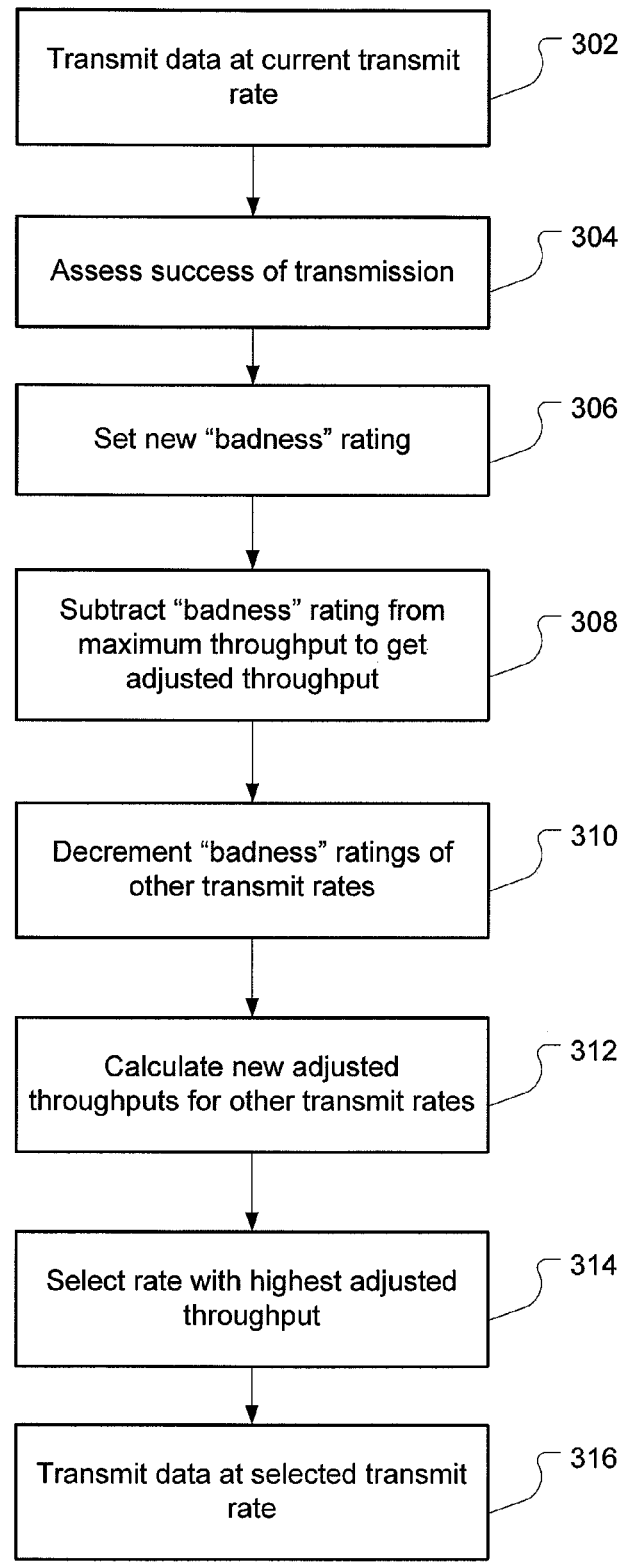
FIG. 3 shows a method of selecting a transmit rate according to a further embodiment of the disclosure.

According to an alternative embodiment of the disclosure, the transmission conditions may be selected by considering the difference between a theoretical maximum throughput value and a badness rating. This embodiment is shown in FIG. 3.

In step 302, data is transmitted using the currently selected transmit rate. The success of this transmission is assessed in step 304. The assessment is used to determine a new badness rating for the transmit rate. The badness ratings according to this embodiment may be determined in a similar way as described with reference to the first embodiment. This new badness rating replaces the previous badness rating for that transmit rate. In step 308, the new badness rating is subtracted from the theoretical maximum throughput for that transmission rate. The throughput value (or NT) is calculated as follows:

$$NT=(\text{Bits per packet})/(\text{Average time to transmit 1 packet, including protocol overheads})$$

where (Average time to transmit 1 packet, including overheads) for a given rate is:

$$(\text{Average time to transmit packet once}) \times (1+\text{Average number of retransmissions for each packet})$$

(Average time to transmit packet once) is a function of rate and protocol and is known a priori. (Average number of retransmissions for each packet) is a function of rate and this is estimated in the environment.

In step 310, stored badness ratings associated with the other available transmit rates are decremented by a predetermined amount. The badness ratings are calculated each time that a transmission rate is used to transmit data over the network, with a new value overwriting the previous value. The adjusted throughput value for each of the other transmit rates is then calculated in step 312 by subtracting the appropriate decremented badness value from the maximum throughput for each transmit rate. The adjusted throughput values are compared and the transmit rate corresponding to the highest of the adjusted values is selected as the new transmit rate.

By subtracting a fixed amount from all badness ratings, these ratings tend towards zero over time. The algorithm can be tweaked by changing the rate at which the badness values decay. Slower decay (e.g., subtracting a smaller amount from the condition ratings during each iteration) means a rate is avoided for longer. It can also be tweaked by changing the frequency of the check (e.g., when the transmission performance of the current rate is assessed to determine whether a new rate should be selected). More frequent checks potentially have the advantage of getting off a bad rate faster, but it also means that there is less data about the current rate.

The method can be improved if retransmission statistics are available for rates faster than the currently selected rate. In one embodiment, means are provided for collecting such statistics. For example, when transmitting mainly at 1 Mbps, statistics for rates 48, 24, 12, 6 Mbit/s could be gathered and stored. This may be achieved by interleaving transmissions at 1 Mbps with transmissions at the faster rates. For example, instead of transmitting a frame at 1 Mbps with 7 retries, a frame could be transmitted at 48 Mbit/s with one retry. Then, if that fails, a frame could be transmitted at 24 Mbit/s with one retry, and so on, with remaining retries at 1 Mbps. Typically the 4 retries at 48, 24, 12, 6 Mbps will take less air time cumulatively than a single transmission of the same frame at 1 Mbps. Based on such statistics it is possible to determine that a faster rate is better than the current one. The transmission rate can be increased on this basis.

This method may have the advantages that:

A few retries does not cause a rate with a lower throughput to be selected;

The algorithm tends to settle on the rate which gives the highest actual throughput, even if it requires more retransmits;

It is relatively quick to do a rate evaluation;

Because of the decaying badness on each rate, if a rate has been bad in the recent past, it will be avoided unless the current rate is even worse. However, if the rate was bad because of temporary interference, it will be returned to eventually.

In some situations it may be that the algorithm described above is over-reliant on the highest rates. If required, this could be mitigated by making checks more quickly.

It is noted that, although the above method involves rating each of the multiple transmission conditions by calculating a theoretical maximum throughput, this does not mean that the method is limited in applicability to transmission rates. Other transmission conditions can also result in different throughputs, e.g., by changing the amount of overhead included in each packet.

The above described methods are particularly advantageous because when transmission at a given rate is poor, e.g., as indicated by retransmission statistics, the above described methods allow for the possibility of increasing the rate and/or changing between CCK/OFDM modulation, rather than just blindly reducing the rate.

The methods described herein may suitably be implemented on any device capable of operating in a network, and specifically in devices that are capable of operating in wireless networks such as those governed by the 802.11 protocols. The methods may be beneficially implemented in devices that transmit data over the network in deciding which transmission condition to use. However, the methods may also be implemented in a control device (e.g., an access point) which may use the above methods to determine which transmission conditions it, and the other transmitting devices in the network, should be using.

Although embodiments of the disclosure may have been described separately, it should be understood that features of one embodiment may be advantageously incorporated in other embodiments. For example, a first embodiment could be modified by incorporating the "decay" feature of a second embodiment with respect to the badness scores stored for the adjacent rates. So, for example, a badness score could be rendered less relevant with time by adjusting it with the passing of time. In this way, the impact of badness scores calculated during environmental conditions that have subsequently passed can be minimized.

Each of the individual features described herein may be used in isolation or in any combination of two or more such features to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. Aspects of the present disclosure may include any of such individual feature or combination of features. In view of the foregoing description it will be evident to a person skilled in the art that various modifications may be made within the scope of the disclosure.

The invention claimed is:

1. A method for transmitting data over a network in which more than two transmission conditions can be used for transmitting data, each transmission condition having a score associated with it that indicates how successful previous data transmissions using that transmission condition have been, and each transmission condition including a transmission rate, the method comprising:
    selecting a transmission condition from the more than two transmission conditions, said selection being made in dependence on a predetermined preference distribution that, for each of the more than two transmission conditions, defines a non-zero probability of that transmission condition being selected, whereby all of the more than two transmission conditions have a chance of being selected;
    using the selected transmission condition when transmitting data over the network, and determining a success of the transmission;
    determining a score for the selected transmission condition in dependence on the success of the transmission using the selected transmission condition;
    updating the preference distribution in dependence on the difference between the score determined for the selected transmission condition and one or more scores associated with transmission conditions other than the selected transmission condition, and thereafter selecting a transmission condition for transmitting data over the network from the more than two transmission conditions in dependence on the updated preference distribution; and
    interleaving transmissions at the transmission rate of the selected transmission condition with transmissions at transmission rates of others of the transmission conditions.

2. A method as claimed in claim 1, wherein the transmission condition includes a method of modulating data for transmission.

3. A method as claimed in claim 1, wherein the selecting is done in such a way that the probability of a transmission condition being selected is in accordance with the probability defined for that transmission condition by the preference distribution.

4. A method as claimed in claim 1, wherein the selecting is done by randomly selecting a transmission condition in such a way that the probability of a transmission condition being selected is in accordance with the probability defined for that transmission condition by the preference distribution.

5. A method as claimed in claim 1, comprising selecting a transmission condition in dependence on the updated preference distribution if the data is transmitted a predetermined number of times using the selected transmission condition without receiving an acknowledgement for that data.

6. A method as claimed in claim 1, comprising selecting a transmission condition in dependence on the updated preference distribution if a predetermined amount of data is successfully transmitted using the selected transmission condition.

7. A method as claimed in claim 1, comprising determining a score for a transmission condition in dependence on the success of a previous transmission using that transmission condition.

8. A method as claimed in claim 7, wherein determining a score for a transmission condition comprises determining the score in dependence on the number of times data has previously been transmitted using that transmission condition without receiving an acknowledgement for that data.

9. A method as claimed in claim 7, wherein determining a score for a transmission condition comprises determining the score in dependence on a nominal data rate associated with that transmission condition.

10. A method as claimed in claim 1, wherein the method comprises updating the preference distribution in dependence on the score associated with a transmission rate immediately higher than the selected transmission rate.

11. A method as claimed in claim 1, wherein the method comprises updating the preference distribution in dependence on the score associated with a transmission rate immediately lower than the selected transmission rate.

12. A method as claimed in claim 1, wherein the network is a wireless network.

13. A method as claimed in claim 1, wherein the network is operable according to an 802.11 protocol.

14. A method as claimed in claim 1, wherein a transmission is deemed to be successful if an acknowledgement is received for the transmitted data, a transmission being repeated until such an acknowledgement is received or until the number of transmissions exceeds a predetermined number without an acknowledgement having been received for the transmitted data, and wherein the determining the success of the transmission is performed in dependence on the number of times the data is transmitted without receiving an acknowledgement for that data.

15. A device for selecting a transmission condition for transmitting data over a network in which more than two transmission conditions can be used for transmitting data, each transmission condition having a score associated with it that indicates how successful previous data transmissions using that transmission condition have been, and each transmission condition including a transmission rate, the device comprising:
    a processor; and
    memory storing software configured to instruct the processor to:
    select a transmission condition from the more than two transmission conditions, said selection being made in dependence on a predetermined preference distribution that, for each of the more than two transmission conditions, defines a non-zero probability of that transmission condition being selected, whereby all of the more than two transmission conditions have a chance of being selected;

use the selected transmission condition when transmitting data over the network, and determine a success of the transmission;

determine a score for the selected transmission condition in dependence on the success of the transmission using the selected transmission condition;

update the preference distribution in dependence on the difference between the score determined for the selected transmission condition and one or more scores associated with transmission conditions other than the selected transmission condition, and thereafter select a transmission condition for transmitting data over the network from the more than two transmission conditions in dependence on the updated preference distribution; and interleave transmissions at the transmission rate of the selected transmission condition with transmissions at transmission rates of others of the transmission conditions.

16. A method as claimed in claim 15, wherein a transmission is deemed to be successful if an acknowledgement is received for the transmitted data, a transmission being repeated until such an acknowledgement is received or until the number of transmissions exceeds a predetermined number without an acknowledgement having been received for the transmitted data, and wherein the determining the success of the transmission is performed in dependence on the number of times the data is transmitted without receiving an acknowledgement for that data.

17. A device for selecting a transmission rate for transmitting data over a network in which multiple transmission rates can be used for transmitting data, each transmission rate having a score associated with it that indicates how successful previous data transmissions using that transmission rate have been, the device comprising:

a processor; and memory storing software configured to instruct the processor to:

select a transmission rate to be used when transmitting data over the network, said selection being made in dependence on a predetermined preference distribution that for each of the multiple transmission rates defines a probability of that transmission rate being selected;

use the selected transmission rate when transmitting data over the network, and determine a score for the selected transmission rate in dependence on a success of the transmission;

interleave transmissions using the selected transmission rate with transmissions using transmission rates immediately higher and lower than the selected transmission rate and determine a score for the rates immediately higher and lower than the selected transmission rate in dependence on the success of those transmissions;

update the preference distribution in dependence on the difference between the score for the selected transmission rate and the scores for the rates immediately higher and lower than the selected transmission rate and thereafter select a transmission rate for transmitting data over the network in dependence on the updated preference distribution, the software configured to further instruct the processor to:

determine, in dependence on the score determined for the selected transmission rate, if the selected transmission rate is meeting a predetermined success threshold; and if the selected transmission rate is determined to be meeting the predetermined success threshold, continue to use the selected transmission rate to transmit data over the network;

if the selected transmission rate is determined not to be meeting the predetermined success threshold, select a new transmission rate for transmitting data over the network, said selection being made in dependence on the updated preference distribution;

wherein, even if the selected transmission rate is determined to be meeting the predetermined success threshold, the device is further arranged to periodically select a new transmission rate for transmitting data over the network, said selection being made in dependence on the updated preference distribution, and further updating the updated preference distribution in dependence on the success of that transmission.

* * * * *

UNITED STATES PATENT AND TRADEMARK OFFICE
CERTIFICATE OF CORRECTION

| | | |
|---|---|---|
| PATENT NO. | : 8,203,944 B2 | Page 1 of 1 |
| APPLICATION NO. | : 11/937977 | |
| DATED | : June 19, 2012 | |
| INVENTOR(S) | : Andrei Barbu Popescu, Timothy Condren Smith and Peter William Stephenson | |

It is certified that error appears in the above-identified patent and that said Letters Patent is hereby corrected as shown below:

In Col. 11, line 25, in Claim 16, delete "method" and insert -- device --.

Signed and Sealed this
Twenty-fifth Day of September, 2012

David J. Kappos
*Director of the United States Patent and Trademark Office*